(12) United States Patent
Ebner et al.

(10) Patent No.: US 6,411,401 B1
(45) Date of Patent: Jun. 25, 2002

(54) PROGRAMMABLE GRAY SCALE HALFTONER WITH OBJECT ORIENTED RESOLUTION CAPABILITY

(75) Inventors: Fritz F. Ebner, Rochester; Michael Kerrigan Hawes, Pittsford; Tse-Kee Chan, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/224,335

(22) Filed: Dec. 31, 1998

(51) Int. Cl.[7] .............................................. H04N 1/405
(52) U.S. Cl. ........................ 358/1.9; 358/1.2; 358/3.06; 382/299
(58) Field of Search .......................... 358/1.2, 1.9, 298, 358/455, 456, 469, 534; 382/299

(56) References Cited

U.S. PATENT DOCUMENTS

| | | | |
|---|---|---|---|
| 4,800,442 A | | 1/1989 | Riseman et al. |
| 5,574,563 A | * | 11/1996 | Hayashi et al. .............. 358/298 |
| 5,862,257 A | * | 1/1999 | Sekine et al. ................. 358/1.9 |

* cited by examiner

Primary Examiner—Thomas D. Lee
(74) Attorney, Agent, or Firm—Fay, Sharpe, Fagan, Minnich & McKee, LLP

(57) ABSTRACT

A method and programmable gray scale halftoner with object oriented resolution capability apparatus are provided for selecting a resolution and gray level range to deliver halftone value data to an associated laser output device. The apparatus includes an input buffer adapted to receive a first group of n pixel data values, each having a resolution object tag associated therewith. A mapping circuit maps the first group of pixel data values to a first one of a plurality of resolution object tags. A first configurable gray scale halftone generator is adapted to generate n halftone values in a range of from 0–8 Bit Gray level modes, each of the n halftone values being associated with a single pixel data value among the first group of pixel data values. Second and third configurable gray scale halftone generators are each respectively adapted to generate n/2 and a single halftone value in a range of from 0–8 Bit Gray level modes. The single halftone value is an average pixel data value among the first group of pixel data values and the n/2 halftone values are multiple average values. A select circuit selects one of the halftone values from the set of gray scale halftone generators based on the first one of the plurality of resolution settings. An output signal line delivers the selected halftone value for use by an associated laser output device.

20 Claims, 8 Drawing Sheets

PROGRAMMABLE GRAY SCALE HALFTONER WITH OBJECT ORIENTED RESOLUTION CAPABILITY

BACKGROUND OF THE INVENTION

The present invention relates to the art of halftoning and, more particularly, to a method and apparatus for enabling programmable gray scale halftoning with object oriented resolution capability. It finds particular application in conjunction with digital printers, and will be described with reference thereto. It is to be appreciated, however, that the present invention is also applicable to other devices and uses including any application where digital imaging is performed.

Currently, most printers available in the market have a fixed single printing resolution capability. Accordingly, all printing is done at this resolution. In printers that have switched resolution capabilities, the resolution normally switches between two fixed resolution modes including a first resolution for pictorials, and a second resolution for non-pictorials such as, for example, text and graphics. It is known in the art that it is possible to change halftoning algorithms within a page using object oriented halftone switching techniques. However, this restricts the algorithms to be used all at the same resolution.

It is therefore desirable to provide a method and apparatus that enables at least three resolutions (HIGH, MEDIUM, and LOW) which can be assigned by user preference to any of the image object types such as pictorial, graphics, or text.

It is also desirable to provide a method and apparatus that enables changing or switching between multiple halftoning algorithms within a page using object oriented halftone switching techniques without the limitation that the algorithms be used all at the same resolution.

It would further be desirable to provide a method and apparatus that uses halftoning technology based on analog pulse width generation and further including halftone patterns. Preferably, the number generating the pulse is selectively set from 0–8 bits and can be tuned to take into account the actual behavior capabilities of the print engine at the respective HIGH, MEDIUM, and LOW resolutions.

The present invention contemplates a new and improved programmable gray scale halftoner method and apparatus with object oriented resolution capability which overcomes the above-referenced problems and others. The current invention allows the use of programmable resolution to enable changing resolution as well as halftoning algorithms within a page, and on a per pixel tag basis.

SUMMARY OF THE INVENTION

In accordance with one aspect of the present invention, a programmable gray scale halftoner with object oriented resolution capability is provided including a digital portion and an analog portion. The analog portion is adapted to generate three triangular waveforms for use in a respective set of three pulse width modulation circuits for pulse width modulating three sets of contone values derived from a group of pixels read into the device. The digital portion of the subject halftoner includes three separate configurable gray scale halftoners that are adapted to each generate contone values derived from contone pixel values among the group of pixels read into the device. Each of the configurable gray scale halftoners include a set of mask buffers that are individually programmable to configure the halftoner to operate in 0–8 bit gray modes of operation. A resolution select circuit reads the object tags associated with each of the individual pixels among the group of pixels and is operative to select a one of the three signals generated from the configurable gray scale halftoners for pulse width modulation with one of the triangular waveforms generated there.

One advantage of the present invention is that the resolution of the image data is selectable between HIGH, MEDIUM, and LOW based on image object tags associated with the image pixels.

Another advantage of the present invention is that the halftoner circuits are programmable by simply writing values into a set of mask buffers so that the halftoning portion of the present invention can be tuned to take into account the actual behavioral capabilities of the print engine at HIGH, MEDIUM, and LOW resolutions.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in certain parts and in certain steps and arrangements of parts and steps, the preferred embodiment of which will be described in detail in this specification and illustrated in the accompanying drawings, which form a part herein and wherein.

DETAILED DESCRIPTION OF THE PREFERRED EMBODIMENT

Figure 1:
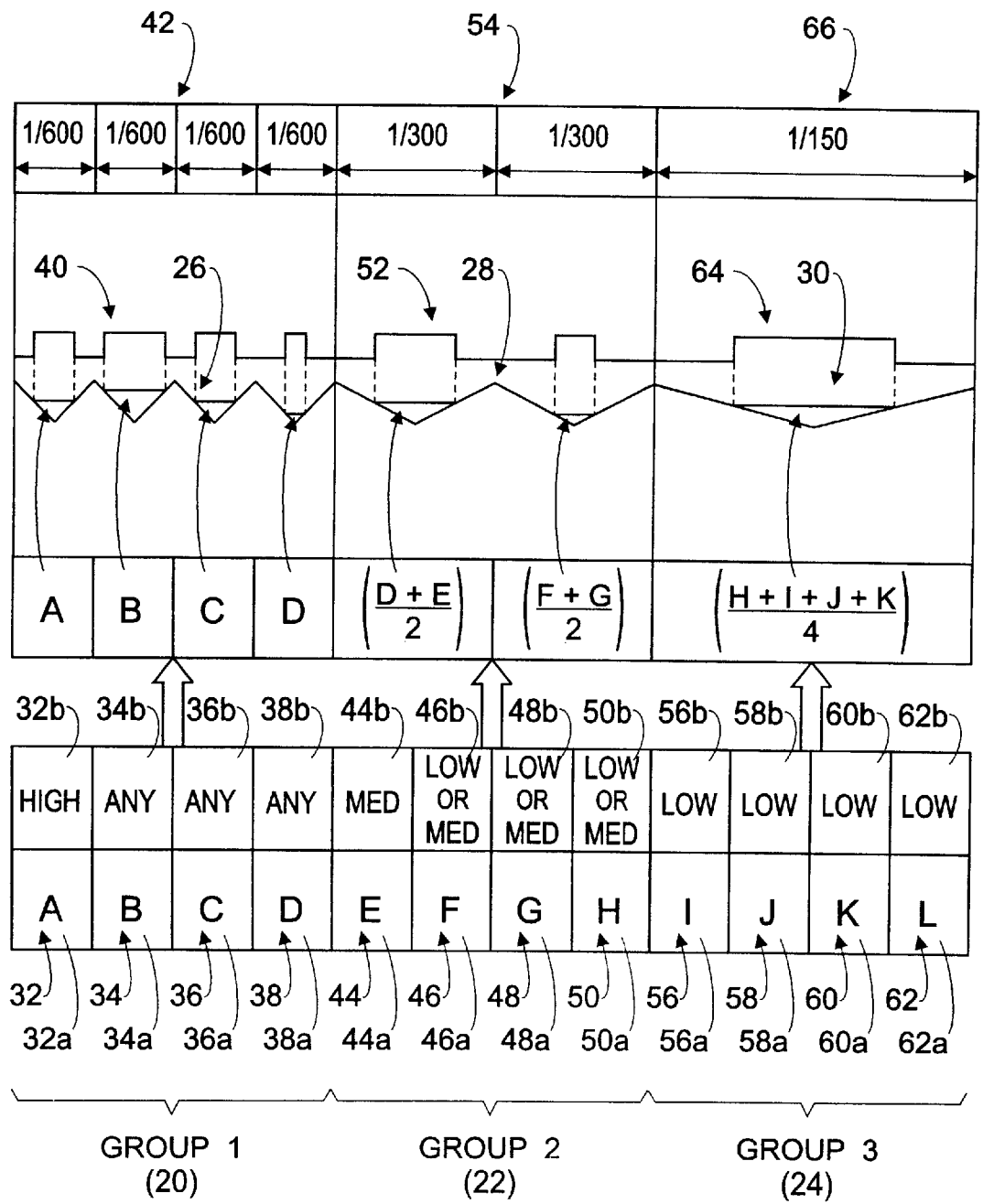
FIG. 1 shows a schematic overview of the functional operation of the subject programmable gray scale halftoner with object oriented resolution capability formed in accordance with the present invention.

Referring now to the drawings wherein the showings are for the purposes of illustrating the preferred embodiment of the invention only and not for purposes of limiting same, the figures show a programmable gray scale halftoner system with object oriented resolution capabilities 10 formed in accordance with the present invention and adapted for use in an associated digital imaging apparatus. The halftoner system with object oriented resolution capability 10 includes a digital portion 12 adapted to interface the system on one end with an operatively associated source 14 of contone image values and, on the other end, with an associated laser raster output device 16. The associated laser output device is of the type commonly used by many xerographic print engines commercially available. In addition to the above, the halftoner system 10 further includes an analog portion 18 adapted to generate multiple triangular waveforms for selective use by the digital portion 12 to generate multiple pulse width modulated (PWM) waveforms. Each of the PWM waveforms represents the contone image values at different resolutions. In accordance with the invention, at least one of the PWM waveforms is selected by the digital portion 12 of the halftoner system 10 for delivery of the pulse width modulated waveform to the associated laser raster output device 16.

FIG. 1 shows a schematic overview of the functional operation of the subject programmable gray scale halftoner system with object oriented resolution capability. Turning now to that figure, three groups of pixel data values 20, 22, and 24 are shown in quasi-tabular form together with three sets of triangular waveforms 26, 28, and 30, each of the waveform sets being representative of a different resolution capability of the subject halftoner system. In the preferred embodiment of the invention, three resolution levels (i.e. low, medium, and high) are enabled. However, the invention is extendable using the methods and apparatus described herein to four or more resolution levels without departing from the spirit of the invention and scope of the instant application.

With continued reference to FIG. 1, the first pixel 32 in the first group of pixel data values 20 includes a contone value 32a of A and an object tag 32b of HIGH. The second pixel 34 in the group includes a contone value 34a of B and an object resolution tag 34b of ANY. Similarly, the third and fourth pixels 36, 38 each include contone values 36a, 38a of C, D and resolution tags 36b, 38b of ANY, ANY, respectively.

In accordance with the preferred embodiment of the invention, the pixels are processed in groups of four as shown. Accordingly, in order to reserve the highest resolution imaging for text-type image data, the halftoner system 10 of the instant invention is adapted to image the groups of text-type pixels using a HIGH resolution imaging mode whenever any one of the resolution tags among the pixel data groups indicate that the associated contone value is text-type image information or, equivalently HIGH. As shown, the first group of pixel data values 20 includes a first pixel 32 having a resolution tag 32b of HIGH. The second, third, and fourth pixels 34, 36, and 38 have ambiguous i.e. ANY, resolution tags 34b, 36b, and 38b. Using the rule identified above, since the first pixel 32 carries a resolution tag indicating that the contone value A is text-type and is to be imaged using a high resolution technique, all of the pixels within the group 20 are imaged using the HIGH resolution technique by selected portions of the subject halftoner system 10 in a manner to be described below.

The first triangular waveform 26 generated in the analog portion 18 is used in the HIGH resolution imaging mode. As shown in FIG. 1, the contone values A–D of the first-fourth pixels 32–38 are used directly for pulse width modulation with the triangular waveform 26 to generate a first laser output pulse signal 40. The first laser output pulse signal is used by the associated raster output device 16 to print the image of the first group of pixel data values 20 in a HIGH resolution mode 42.

With yet continued reference to FIG. 1, the second group of pixel data values 22 includes a first pixel 44 having a contone value 44a of E and a resolution tag 44b of MEDIUM, a second pixel 46 having a contone value 46a of F and a resolution tag 46b of LOW, a third pixel 48 having a contone value 48a of G and a resolution tag 48b of LOW, and a fourth pixel 50 having a contone value 50a of H and a resolution tag 50b of LOW. In the preferred embodiment of the invention, a MEDIUM resolution mode is used to print the group of pixel data values whenever any one of the resolution tags is set to MEDIUM and the other pixels in the group have MEDIUM or LOW resolution tags. The MEDIUM resolution is used for graphics and sweep-type printing operations.

According to the rule set forth above, the halftone system 10 of the present invention selectively applies the second triangular waveform 28 generated by the analog portion 18 first against an average of the first and second contone values 44a and 46a of E and F, and then against the average value of the third and fourth contone values 48a and 50a of G and H. The pair of average values (E+F)/2 and (G+H)/2 are used to pulse width modulate the second triangular waveform 28 to generate the second laser output pulse signal 52. The second laser output pulse signal is used by the associated raster output device 16 to print an image of the second group of pixel data values 22 in a MEDIUM resolution print mode 54.

Lastly in connection with FIG. 1, the third group of pixel data values 24 includes a first pixel 56 having a contone value 56a of I and a resolution tag 56b of LOW, a second pixel 58 having a contone value 58a of J and a resolution tag 58b of LOW, a third pixel 60 having a contone value 60a of K and a resolution tag 60b of LOW, and, lastly, a fourth pixel 62 having a contone value 62a of L and a resolution tag 62b of LOW. In accordance with the preferred embodiment of the invention, the halftoner system uses a LOW resolution mode to print an image of a group of pixel data values that are all tagged with a LOW resolution tag. As an example, pictorials are preferably printed in LOW resolution mode because that mode gives the greatest color depth i.e. number of gray levels.

According to the strategy described above, since each of the first-fourth pixels 56–62 have a LOW resolution tag, the LOW resolution triangular waveform 30 is used together with an average contone value (I+J+K+L)/4 of the four pixels 56–62 as shown. The third triangular waveform 30 is pulse width modulated by the average of the contone values 56a–62a of I–J of the first-fourth pixel 56–62 to generate a third laser output pulse signal 64. The third laser output pulse signal is used by the associated raster output device 16 to print an image of the third group of pixel data values 24 in a LOW resolution mode 66.

Figure 2:
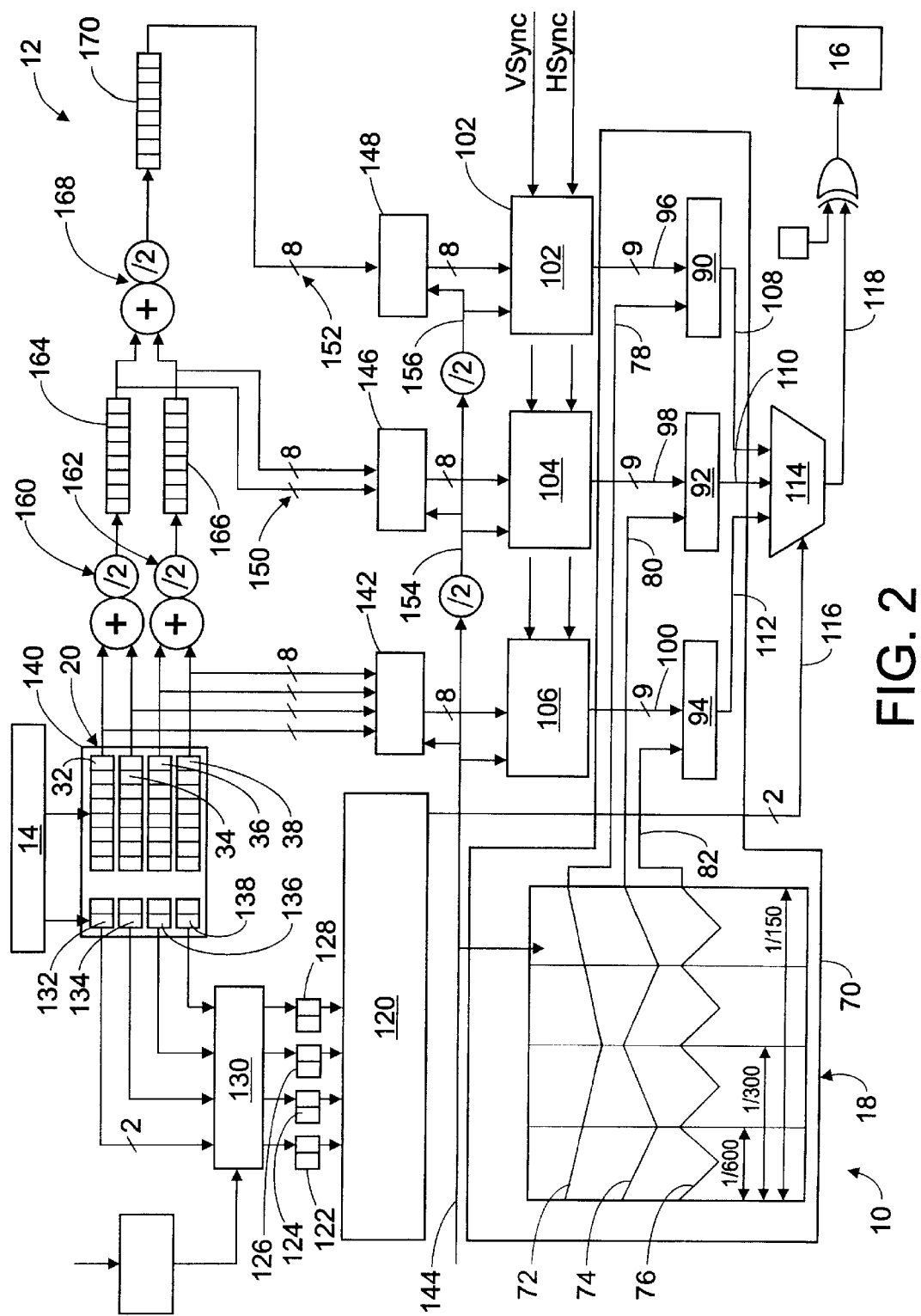
FIG. 2 is a schematic representation showing the digital and analog portions of the subject programmable gray scale halftoner with object oriented resolution capability in accordance with the present invention.

Turning now to FIG. 2, a schematic representation of the subject halftoner system 10 is illustrated showing the digital portion 12 together with the analog portion 18 arranged between an associated source 14 of contone image values and an associated laser raster output device 16. The analog portion 18 of the halftone system 10 includes a triangular waveform generator 70 adapted to generate low, medium, and high frequency triangular waveforms 72–76 on respective low, medium, and high triangular waveform signal lines 78, 80, and 82. Each of the triangular waveform signal lines 78–82 are adapted to communicate the low, medium, and high frequency triangular waveforms 72–76 to a corresponding set of low, medium, and high resolution pulse width modulator circuits 90–94 as shown. Each of the pulse width modulation circuits 90–94 perform a modulation function between the low, medium, and high frequency triangular waveforms 72–76 and a set of analog values received into the analog portion 18 on a set of low, medium, and high resolution contone value data signal lines 96–100, respectively. The analog contone values are generated in a respective set of low, medium, and high resolution configurable gray scale halftoner devices 102, 104, and 106, respectively. The operation of the configurable gray scale halftoner devices will be described in greater detail below in connection with FIGS. 3–8.

In accordance with the preferred embodiment of the invention, each of the low, medium, and high frequency triangular waveforms 72–76 are continuously generated by the triangular waveform generator 70 so that the pulse width modulation functions can be executed in each of the low, medium, and high resolution pulse width modulation circuits 90–94 simultaneously and continuously. The pulse width modulated square wave signals are output from the analog potion 18 on a set of corresponding low, medium, and high PWM signal lines 108–112. A digital select circuit 114 is operative in response to a select signal carried on a select signal line 116 to deliver a single one of the low, medium, and high PWM signals from the signal lines 108–112 to a laser output signal line 118 for ready use by the associated laser raster output device 16.

Essentially, in accordance with the present invention, multiple resolution signals are generated simultaneously and continuously using the circuits, devices, and techniques shown in the Figures and described herein. It is an advantage of the present invention, however, to enable object oriented resolution selection through the use of the digital select circuit 114 and a resolution select circuit 120. As shown, the resolution select circuit 120 generates the select signal on the select signal line 116 so that a selected one of the first, second, or third PWM laser output pulse signals 40, 52, 64 carried on the high, medium, and low PWM signal lines 112, 110, 108, respectively, are delivered to the associated laser raster output device 16.

The resolution select circuit 120 is adapted to generate the appropriate select signal based upon a set of resolution tags 122–128 generated by a object tag to resolution tag mapping circuit 130. Essentially, the resolution select circuit 120 operates substantially in a manner as described above in connection with the discussion of FIG. 1 wherein a high resolution select signal is generated when any of the resolution tags 122–128 indicate a high resolution. The select circuit 120 generates a low resolution signal when all of the resolution tags 122–128 indicate a low resolution tag. Lastly, a medium resolution signal is generated by the resolution select circuit 120 when none of the resolution tags 122–128 indicate a high resolution and at least one of the resolution tags indicates a medium resolution.

The object tag to resolution tag mapping circuit 130 maps a set of object tags 132–138 to a corresponding set of resolution tags 122–128. Preferably, the circuit maps text-type object tags with high resolution tags, graphics or sweep-type object tags, with medium resolution tags, and pictorial-type object tags 132–138 with low resolution tags.

A pixel input buffer 140 includes a plurality of memory locations that are adapted to receive a one of the groups of pixel data values 20, 22, or 24 as shown. As noted above, in accordance with the preferred embodiment of the invention, the pixel data are manipulated in groups of four. The group of pixel data values are delivered to the high resolution configurable gray scale halftoner 106 one pixel value at a time using a sequencing circuit 142. Preferably, the sequencing circuit is operative in response to a clock signal 144 to clock or shift each of the pixel data into the high resolution halftoner device 106 as a type of a latch.

Similar to the above, second and third sequencing circuits 146–148 are used to clock or shift respective sets of contone data values 150, 152 into the medium and low resolution configurable gray scale halftoner devices 104, 102, respectively. The second sequencing circuit 146 is responsive to a clock signal 154 having half the frequency of the first clock signal 144. Similarly, the third sequencing circuit 148 is responsive to a third clock signal 156 having one half the clock frequency of the second clock signal 154.

A pair of averager circuits 160, 162 are adapted to read pairs of pixels from among the group of pixel data values 20 to generate a set of average contone values 164, 166. The first average contone value 164 represents the average value of the first and second pixel 32, 34 from among the first group of pixel data values 20.

Similarly, the second average contone value 166 represents an average of the third and fourth pixel contone values 36, 38 from among the group of pixel data values 20. A third averager circuit 168 is used to generate a single average contone value 170 representative of an average value of the first-fourth pixels 32–38 among the first group of pixel data values 20.

The preferred embodiment of the configurable gray scale halftoner device of the present invention is illustrated in FIGS. 3–8. Although the discussion to follow immediately below is directed to the high resolution configurable gray scale halftoner device 106, the descriptions and discussions apply equally to the low and medium resolution gray scale halftoner devices 102, 104, unless otherwise noted.

Figure 3:
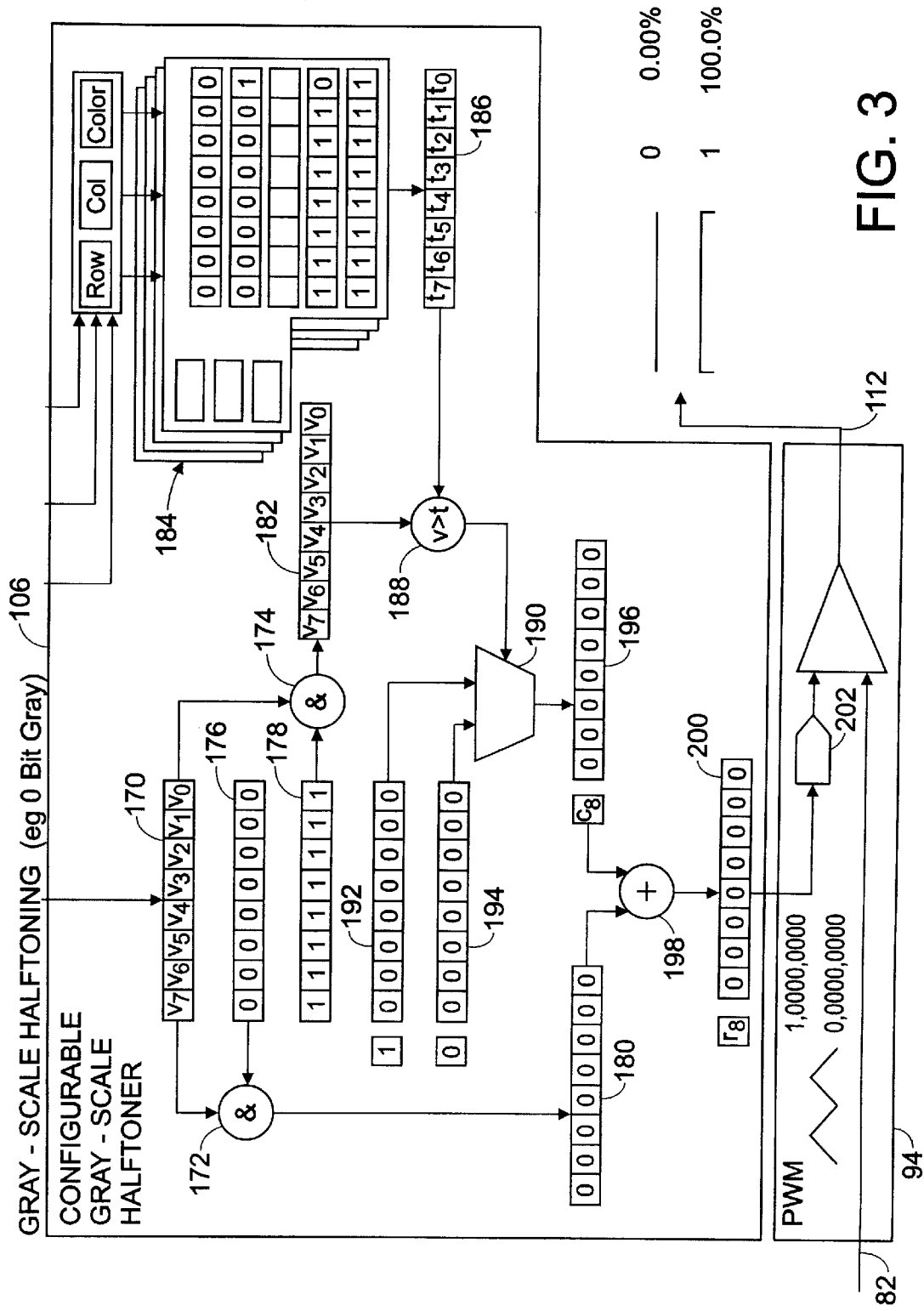
FIG. 3 is a schematic representation of the subject programmable gray scale halftoner system of the present invention illustrating the system in a 0 bit gray configuration.
Figure 4:
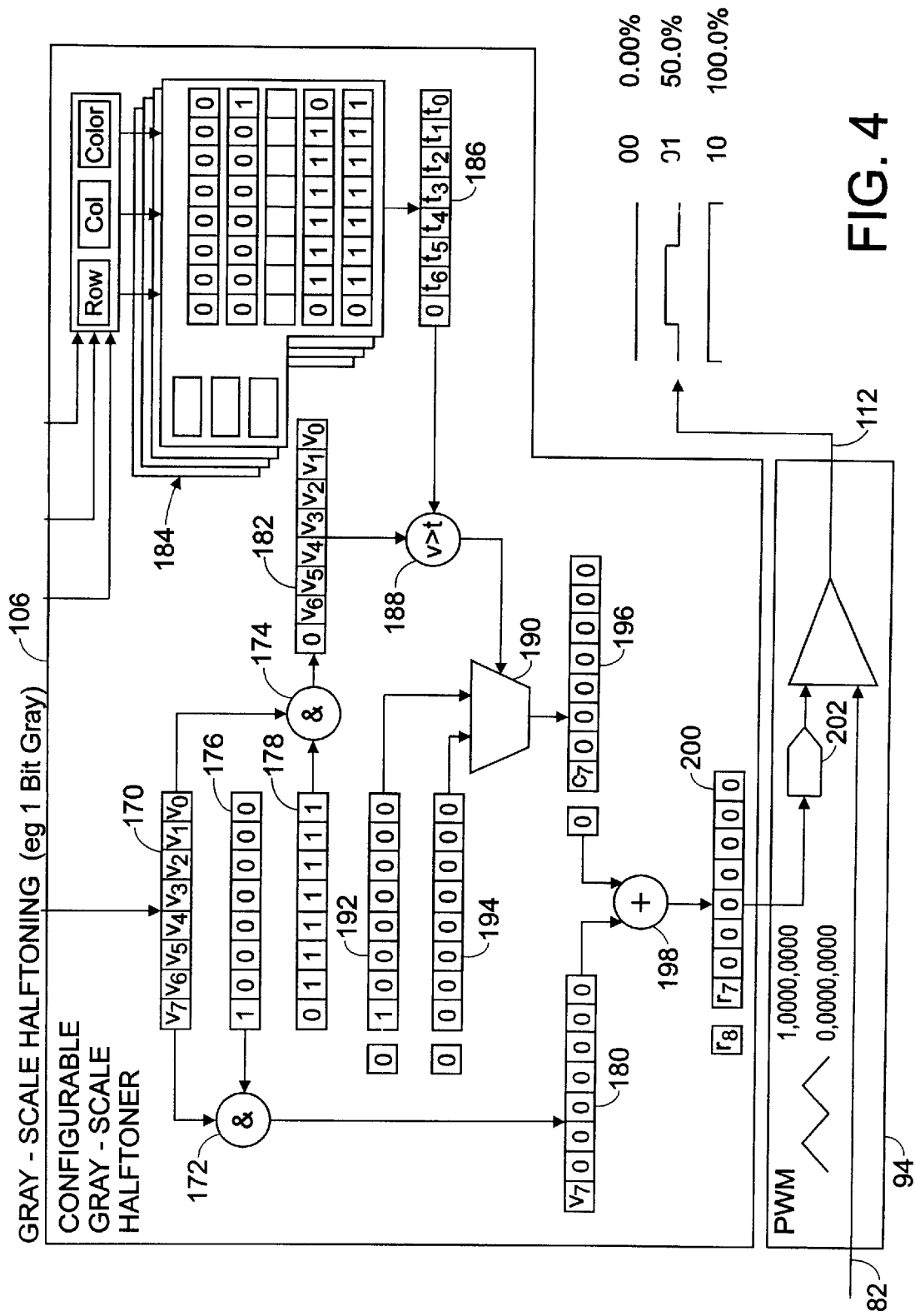
FIG. 4 is a schematic representation of the subject programmable gray scale halftoner system of the present invention illustrating the system in a 1 bit gray configuration.
Figure 5:
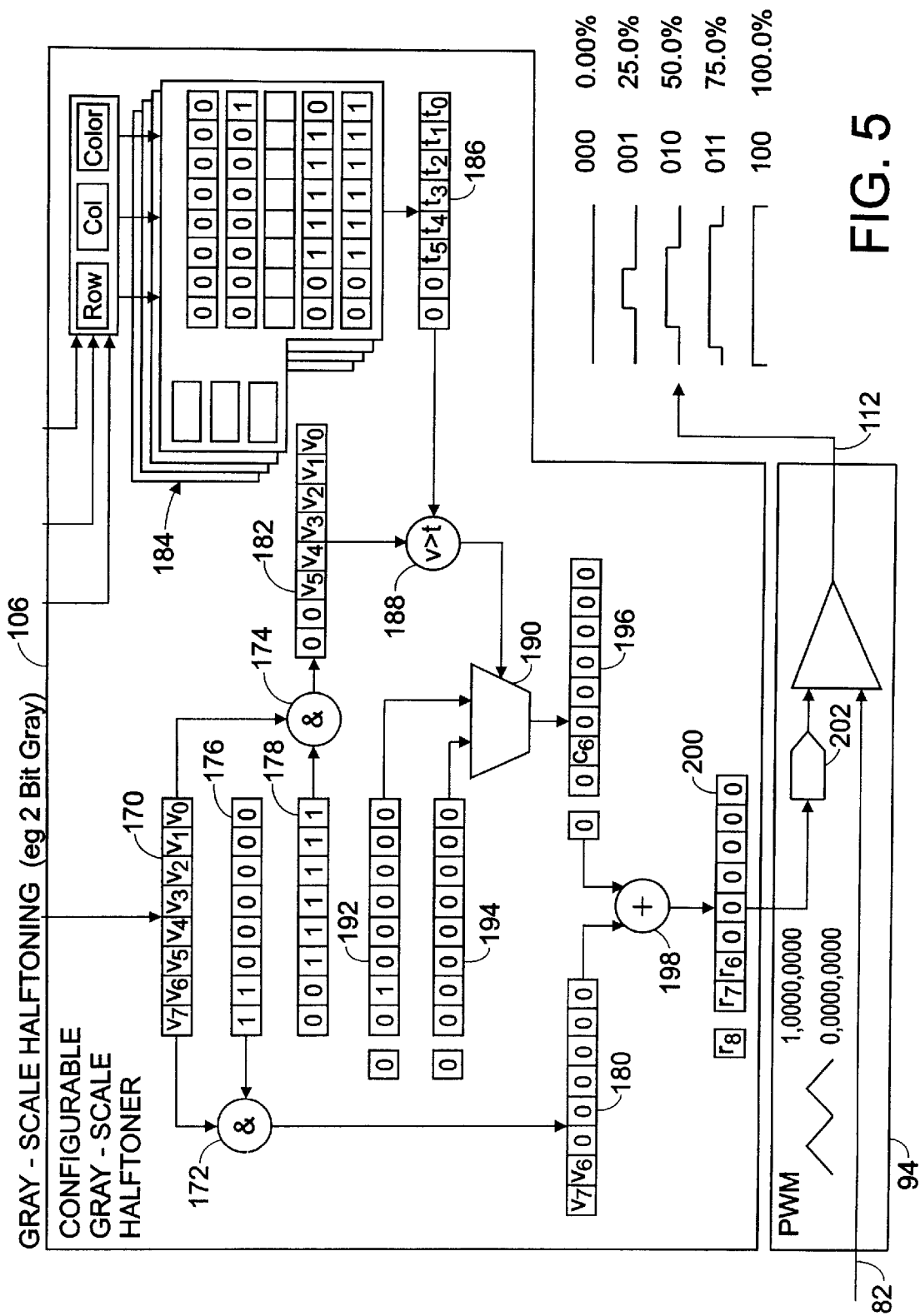
FIG. 5 is a schematic representation of the subject programmable gray scale halftoner system of the present invention illustrating the system in a 2 bit gray configuration.
Figure 6:
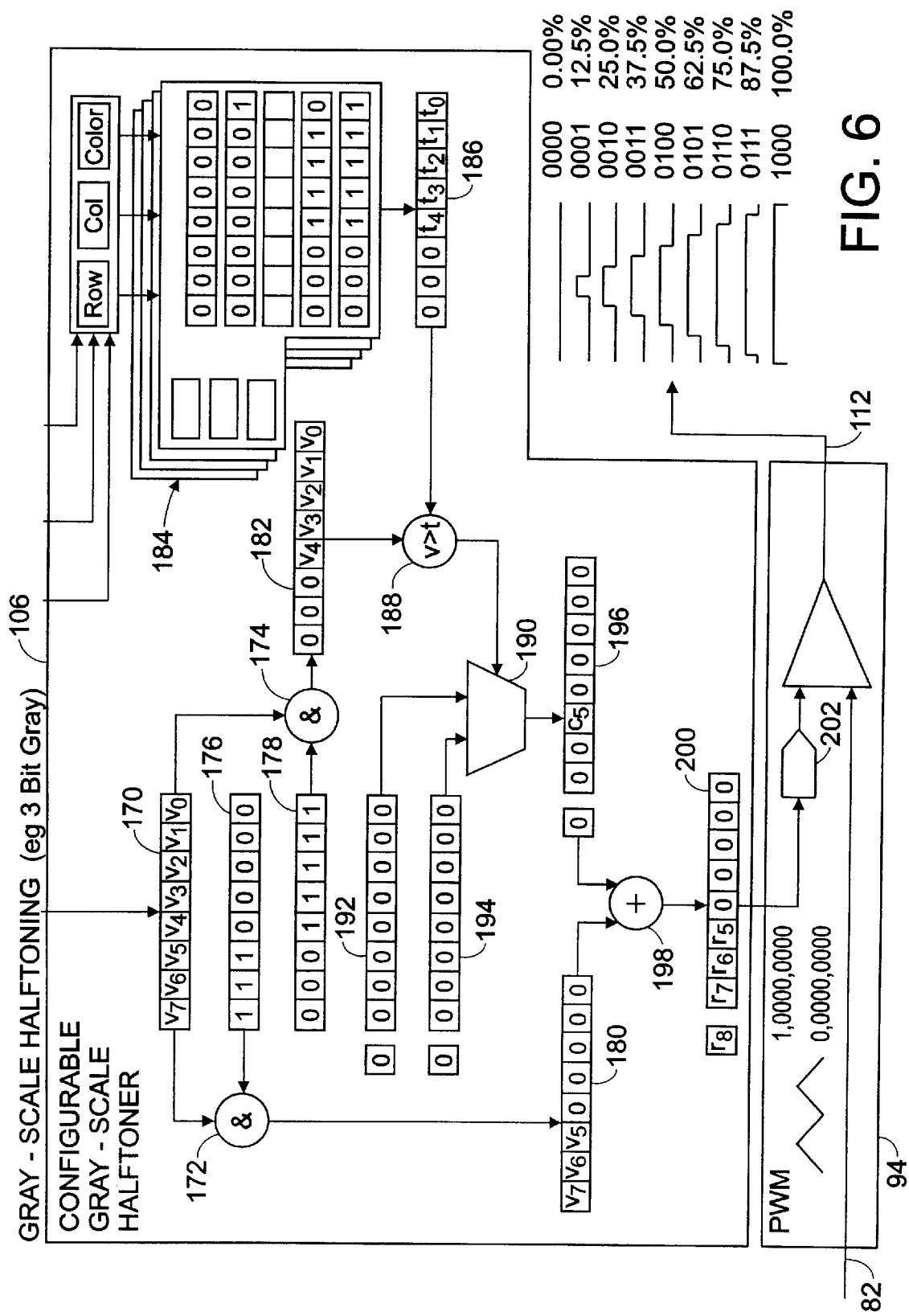
FIG. 6 is a schematic representation of the subject programmable gray scale halftoner system of the present invention illustrating the system in a 3 bit gray configuration.
Figure 7:
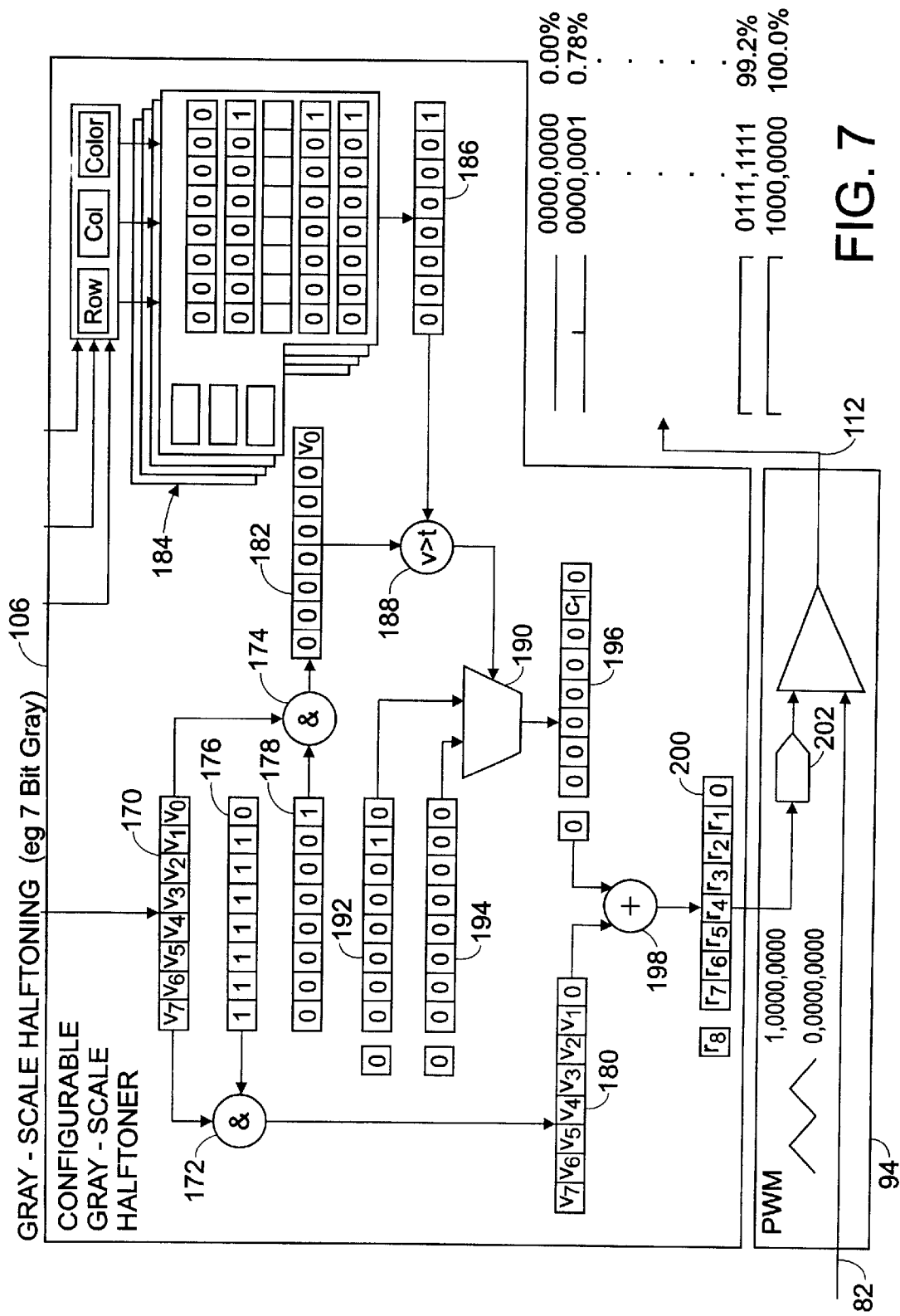
FIG. 7 is a schematic representation of the subject programmable gray scale halftoner system of the present invention illustrating the system in a 7 bit gray configuration; and, FIG. 8 is a schematic representation of the subject programmable gray scale halftoner system of the present invention illustrating the system in an 8 bit gray configuration.
Figure 8:
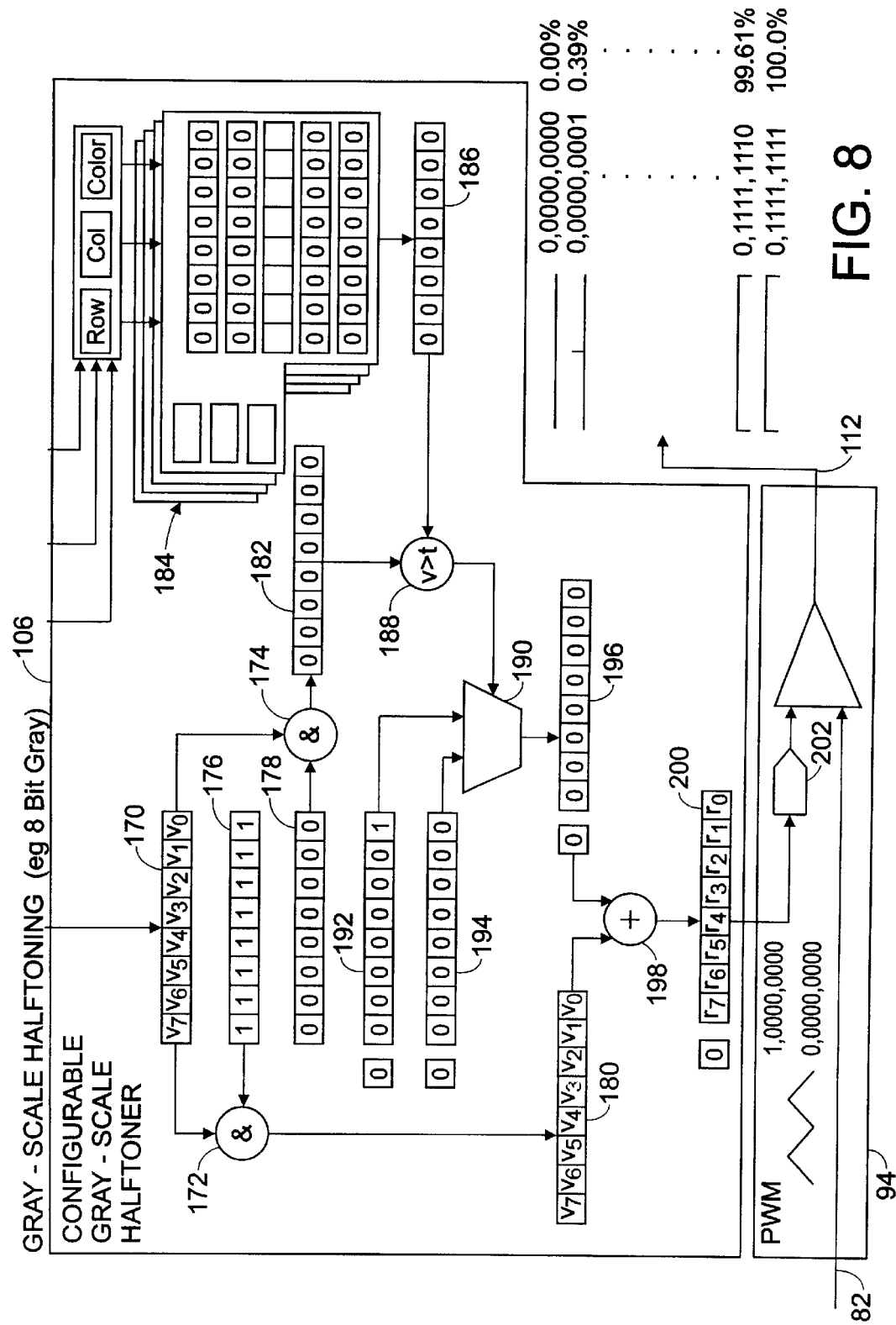

Turning now to FIG. 3, the gray scale halftoner device 106 includes a contone value input buffer 170 adapted to receive a series of single contone values from the first frequencing circuit 142 in a manner described above. A pair of logical AND devices 172, 174 perform a logical boolean AND operation on the contone value disposed in the contone value input buffer 170 and first and second mask values stored in first and second mask buffers 176, 178, respectively. In the example illustrated in FIG. 3, the gray scale halftoner device is configured as a "0 Bit Gray" halftoner and accordingly is arranged to deliver two gray levels (i.e. 0% and 100%) based on the contone value of the data disposed in the buffer 170. To that end, the first and second mask buffers 176, 178 are loaded with the values "00000000" and "11111111", respectively. A first result buffer 180 is adapted to store the results of the logical AND operation executed between the contone value stored in the input buffer 170 and the first mask value stored in the first mask buffer 176. Similarly, a second results buffer 182 is adapted to store the value of the logical AND operation performed between the contone value in the buffer 170 and the second mask value in the buffer 178. The value in the second result buffer 182 is compared against a halftone threshold value derived from a threshold array 184 and stored in a threshold array value buffer 186. The threshold array is loaded and accessed based on a suitable clock signal and horizontal and vertical page location signals using well-known techniques.

A comparison circuit 188 is adapted to perform a level comparison between the value stored in the second result buffer 182 and the threshold array buffer 186. Based upon that comparison, a select circuit 190 is used to deliver a one of a third mask value stored in a third mask buffer 192 and a 0 value stored in a zero buffer 194 to a third result buffer 196.

An addition circuit 198 adds the values stored in the first result buffer 180 and the third result buffer 196 and stores result in an output buffer 200. The output buffer is used to drive a digital-to-analog conversion circuit 202 disposed in the pulse width modulation circuit 94.

As shown in connection with FIG. 3, the configurable gray scale halftoner is adapted to generate two gray scale levels based on the "0 Bit Gray" configuration of the halftoner as determined by the value stored in the mask buffers 176, 178, and 192.

The gray scale halftoner device 106 is configurable within a range of 0 Bit Gray to 8 Bit Gray by simply reloading the mask buffers 176, 178, 192 with different values to realize a range of gray levels at the output. Table 1 below illustrates the preferred values to be loaded in the first, second, and third mask buffers in order to realize 0–8 bits of gray in the configurable halftoner device.

TABLE 1

| Bits of Gray | Mask 1 | Mask 2 | Mask 3 | Threshold Array Range |
|---|---|---|---|---|
| 0 | 0000,0000 | 1111,1111 | 1,0000,0000 | 0–255 |
| 1 | 1000,0000 | 0111,1111 | 0,1000,0000 | 0–127 |
| 2 | 1100,0000 | 0011,1111 | 0,0100,0000 | 0–63 |
| 3 | 1110,0000 | 0001,1111 | 0,0010,0000 | 0–31 |
| 4 | 1111,0000 | 0000,1111 | 0,0001,0000 | 0–15 |
| 5 | 1111,1000 | 0000,0111 | 0,0000,1000 | 0–7 |
| 6 | 1111,1100 | 0000,0011 | 0,0000,0100 | 0–3 |
| 7 | 1111,1110 | 0000,0001 | 0,0000,0010 | 0–1 |
| 8 | 1111,1111 | 0000,0000 | 0,0000,0001 | 0–0 |

FIGS. 4–8 show 1, 2, 3, 7, and 8 Bit Gray halftoner configurations, respectively. In each example, the mask buffers 176, 178, and 192 are loaded with the suitable mask values as illustrated in the Figures, in accordance with Table 1 above.

The invention has been described with reference to the preferred embodiment. Obviously, modifications and alterations will occur to others upon a reading and understanding of the specification. It is intended to include all such modifications and alterations insofar as they come within the scope of the appended claims or the equivalents thereof.

Having thus described the preferred embodiment, the invention is now claimed to be:

1. A method of selecting a resolution and a gray level range for delivering halftone value data to a laser output device in a digital imaging apparatus, the method comprising the steps of:

interrogating a first group of n pixel data values to determine a first group of n resolution object tags associated with the first group of n pixel data values;

based on said first group of n resolution object tags, mapping the first group of n pixel data values to a first one of a plurality of m resolution settings in the imaging apparatus, the mapping further including, mapping the first group of n pixel data values to a HIGH resolution setting, of said m resolution settings, when any one of the first group of n pixel data values is associated with a first object tag indicative of text type image data, mapping the first group of n pixel data values to a MEDIUM resolution setting of said m resolution setting, when none of the first group of n pixel data values is associated with a second object tag indicative of graphics type image data, and, mapping the first group of n pixel data values to a LOW resolution setting of said m resolution settings, when all of the first group of n pixel data values are associated with a third object tag indicative of pictorial type image data;

in a first gray scale halftone generator, generating n halftone values, each of the n halftone values being associated with a single pixel data value among said first group of n pixel data values;

in a second gray scale halftone generator, generating n/2 halftone values, each of the n/2 halftone values being associated with n/2 pixel data values among said first group of n pixel data values;

in a third gray scale halftone generator, generating a single halftone value, the single halftone value being associated with an average pixel data value among said first group of n pixel data values;

based on said first one of said plurality of m resolution settings, selecting as a selected halftone value set, a one of said n halftone values, said n/2 halftone values, and said single halftone value; and, delivering the selected halftone value set to an output signal line for use by a laser output device associated with the digital imaging device.

2. The method according to claim 1 wherein the steps of generating said n halftone values, generating said n/2 halftone values, and generating said single halftone value are performed substantially simultaneously in a digital imaging apparatus.

3. The method according to claim 1 wherein the step of generating said n/2 halftone values associated with said n/2 pixel data values includes averaging pairs of said n pixel data values to generate n/2 average halftone values.

4. The method according to claim 1 wherein:

the step of generating said n halftone values in the first gray scale halftone generator includes pulse width modulating each of said n halftone values with a triangular waveform having a first frequency;

the step of generating said n/2 halftone values in the second gray scale halftone generator includes pulse width modulating each of said n/2 halftone values with a triangular waveform having a second frequency, the second frequency being half the first frequency; and, the step of generating said single halftone value in the third gray scale halftone generator includes pulse width modulating said single halftone value with a triangular waveform having a third frequency, the third frequency being half the second frequency.

5. A method of selecting a resolution and a gray level range for delivering halftone value data to a laser output device in a digital imaging apparatus, the method comprising the steps of:

interrogating a first group of n pixel data values to determine a first group of n resolution object tags associated with the first group of n pixel data values;

based on said first group of n resolution object tags, mapping the first group of n pixel data values to a first one of a plurality of m resolution settings in the imaging apparatus;

in a first gray scale halftone generator, loading a first set of mask buffers in the first gray scale halftone generator with a first set of mask buffer values and generating n halftone values, each of the n halftone values being associated with a single pixel data value among said first group of n pixel data values, the step of generating said n halftone values in said first gray scale halftone generator including configuring the first gray scale halftone generator to operate in a one of a 0 Bit Gray level-8 Bit Gray level mode;

in a second gray scale halftone generator, loading a second set of mask buffers in the second gray scale halftone generator with a second set of mask buffer values and generating n/2 halftone values, each of the n/2 halftone values being associated with n/2 pixel data values among said first group of n pixel data values, the step of generating said n/2 halftone values in said second gray scale halftone generator including configuring the second gray scale halftone generator to operate in a one of a 0 Bit Gray level-8 Bit Gray level mode;

in a third gray scale halftone generator, loading a third set of mask buffers in a third gray scale halftone generator with a third set of buffer values and generating a single halftone value, the single halftone value being associated with an average pixel data value among said first group of n pixel data values, the step of generating said single halftone value in said third gray scale halftone generator including configuring the third gray scale halftone generator to operate in a one of a 0 Bit Gray level-8 Bit Gray level mode;

based on said first one of said plurality of m resolution settings, selecting as a selected halftone value set, a one of said n halftone values, said n/2 halftone values, and said single halftone value; and, delivering the selected halftone value set to an output signal line for use by a laser output device associated with the digital imaging device.

6. The method according to claim 5, wherein the steps of configuring said first, second, and third gray scale halftone generators includes configuring the first, second, and third gray scale halftone generators so that each of the first, second, and third gray scale halftone generators operate in a one of one of a 0 Bit Gray level-8 Bit Gray level mode.

7. The method according to claim 5 wherein the steps of generating said n halftone values, generating said n/2 halftone values, and generating said single halftone value are performed substantially simultaneously in a digital imaging apparatus.

8. The method according to claim 5 wherein the step of generating said n/2 halftone values associated with said n/2 pixel data values includes averaging pairs of said n pixel data values to generate n/2 average halftone values.

9. The method according to claim 5 wherein:
the step of generating said n halftone values in the first gray scale halftone generator includes pulse width modulating each of said n halftone values with a triangular waveform having a first frequency;
the step of generating said n/2 halftone values in the second gray scale halftone generator includes pulse width modulating each of said n/2 halftone values with a triangular waveform having a second frequency, the second frequency being half the first frequency; and,
the step of generating said single halftone value in the third gray scale halftone generator includes pulse width modulating said single halftone value with a triangular waveform having a third frequency, the third frequency being half the second frequency.

10. In a digital imaging apparatus, method of selecting a resolution and a gray level range for delivering halftone value data to a laser output device operatively associated with the digital imaging apparatus, the method comprising the steps of:

interrogating a first group of n pixel data values to determine a first group of n resolution object tags associated with the first group of n pixel data values;

based on said first group of n resolution object tags, mapping the first group of n pixel data values to a first one of a plurality of m resolution settings in the imaging apparatus the mapping further including, mapping the first group of n pixel data values to a HIGH resolution setting when any one of the first group of n pixel data values is associated with a first object tag indicative of text type image data, mapping the first group of n pixel data values to a MEDIUM resolution setting when none of the first group of n pixel data values is associated with said first object tag and at least one of the first group of n pixel data values is associated with second object tag indicative of graphics type image data, and, mapping the first group of n pixel data values to a LOW resolution setting when all of the first group of n pixel data values are associated with a third object tag indicative of pictorial type image data;

in a first gray scale halftone generator, generating n halftone values, each of the n halftone values being associated with a single pixel data value among said first group of n pixel data values;

in at least one second gray scale halftone generator, generating a set of halftone values, each of the set of halftone values being associated with a set of from n−1 to a pair of said pixel data values among said first group of n pixel data values;

in an averaging gray scale halftone generator, generating a single halftone value, the single halftone value being associated with an average pixel data value among said first group of n pixel data values;

based on said first one of said plurality of m resolution settings, selecting a one of said n halftone values, said set of halftone values, and said single halftone value as a selected halftone value set; and, delivering the selected halftone value set to an output signal line for use by the laser output device associated with the digital imaging device.

11. The method according to claim 10 wherein the steps of generating said n halftone values, generating said set of halftone values, and generating said single halftone value are performed substantially simultaneously in a digital imaging apparatus.

12. The method according to claim 10 wherein the step of generating said set of halftone values associated with said set of pixel data values includes averaging pairs of said n pixel data values to generate average halftone values.

13. The method according to claim 10 wherein:
the step of generating said n halftone values in the first gray scale halftone generator includes pulse width modulating each of said n halftone values with a triangular waveform having a first frequency;
the step of generating said set of halftone values in the at least one second gray scale halftone generator includes pulse width modulating each of said set of halftone values with a triangular waveform having a second frequency, the second frequency being half the first frequency; and,
the step of generating said single halftone value in the averaging gray scale halftone generator includes pulse width modulating said single halftone value with a triangular waveform having a third frequency, the third frequency being half the second frequency.

14. In a digital imaging apparatus, a method of selecting a resolution and a gray level range for delivering halftone value data to a laser output device operatively associated with the digital imaging apparatus, the method comprising the steps of:

interrogating a first group of n pixel data values to determine a first group of n resolution object tags associated with the first group of n pixel data values;

based on said first group of n resolution object tags, mapping the first group of n pixel data values to a first one of a plurality of m resolution settings in the imaging apparatus;

in a first gray scale halftone generator, generating n halftone values, each of the n halftone values being associated with a single pixel data value among said first group of n pixel data values, the step of generating said n halftone values in said first gray scale halftone generator including configuring the first gray scale halftone generator to operate in a one of a 0 Bit Gray level-8 Bit Gray level mode by loading a first set of mask buffers in the first gray scale halftone generator with a first set of mask buffer values;

in at least one second gray scale halftone generator, generating a set of halftone values, each of the set of halftone values being associated with a set of from n−1 to a pair of said pixel data values among said first group of n pixel data values, the step of generating said set of halftone values in said at least one second gray scale halftone generator including configuring the at least one second gray scale halftone generator to operate in a one of a 0 Bit Gray level-8 Bit Gray level mode by loading a second set of mask buffers in the at least one second gray scale halftone generator with a second set of mask buffer values;

in an averaging gray scale halftone generator, generating a single halftone value, the single halftone value being associated with an average pixel data value among said first group of n pixel data values, the step of generating said single halftone value in said averaging gray scale halftone generator including configuring the averaging gray scale halftone generator to operate in a one of a 0 Bit Gray level-Bit Gray level mode by loading a third set of mask buffers in the averaging gray scale halftone generator with a third set of mask buffer values;

based on said first one of said plurality of m resolution settings, selecting a one of said n halftone values, said set of halftone values, and said single halftone value as a selected halftone value set; and, delivering the selected halftone value set to an output signal line for use by the laser output device associated with the digital imaging device.

15. The method according to claim 14 wherein the steps of generating said n halftone values, generating said set of halftone values, and generating said single halftone value are performed substantially simultaneously in a digital imaging apparatus.

16. The method according to claim 15 wherein the step of generating said set of halftone values associated with said set of pixel data values includes averaging pairs of said n pixel data values to generate average halftone values.

17. An apparatus in a digital imaging device for selecting a resolution and a gray level range to deliver halftone value data to an associated laser output device, the apparatus comprising:

an input buffer adapted to receive a first group of n pixel data values, each of the first group of n pixel data values having a resolution object tag associated therewith;

a mapping circuit for mapping the first group of n pixel data values to a first one of a plurality of m resolution settings based on the first group of n resolution object tags;

a first configurable gray scale halftone generator adapted to generate n halftone values in a one of a 0 Bit Gray level-8 Bit Gray level mode, each of the n halftone values being associated with a single pixel data value among said first group of n pixel data values and the first configurable gray scale halftone generator including a first set of mask buffers adapted to store a first set of mask buffer values;

at least one second configurable gray scale halftone generator adapted to generate a set of n−1 to a pair of halftone values in a one of a 0 Bit Gray level-8 Bit Gray level mode, each of the set of halftone values being associated with a set of n−1 to a pair of pixel data values among said first group of n pixel data values, and the at least one second configurable gray scale halftone generator including a second set of mask buffers adapted to store a second set of mask buffer values;

an averaging configurable gray scale halftone generator adapted to generate a single halftone value in a one of a 0 Bit Gray level-8 Bit Gray level mode, the single halftone value being associated with an average pixel data value among said first group of n pixel data values and the averaging configurable gray scale halftone generator including a third set of mask buffers adapted to store a third set of mask buffer values;

a select circuit adapted to select as a selected halftone value set based on said first one of said plurality of m resolution settings, a one of said n halftone values, said set of halftone values, and said single halftone value; and, an output signal line for delivering said selected halftone value set for use by said associated laser output device to generate an image of said first group of n pixel data values.

18. The apparatus according to claim 17 wherein:

the first configurable gray scale halftone generator being responsive to the first set of mask buffer values to generate said n halftone values in said one of said 0 Bit Gray level-8 Bit Gray level mode;

the at least one second configurable gray scale halftone generator being responsive to the second set of mask buffer values to generate said set of halftone values in said one of said 0 Bit Gray level-8 Bit Gray level mode; and, the averaging configurable gray scale halftone generator being responsive to a third set of mask buffer values to generate said single halftone value in said one of said 0 Bit Gray level-8 Bit Gray level mode.

19. The apparatus according to claim 18 further comprising a waveform generator circuit adapted to generate a plurality of triangular waveforms, a first triangular waveform having a first frequency for use by said first configurable gray scale halftone generator, a second triangular waveform having a second frequency for use by said at least one second configurable gray scale halftone generator, said second frequency being half said first frequency, and a third triangular waveform for use by said averaging configurable gray scale halftone generator, said third frequency being half said second frequency.

20. The apparatus according to claim 19 wherein said mapping circuit includes means for:

mapping the first group of n pixel data values to a HIGH resolution setting when any one of the first group of n pixel data values is associated with a first object tag indicative of text-type image data;

mapping the first group of n pixel data values to a MEDIUM resolution setting when none of the first group of n pixel data values is associated with said first object tag and at least one of the first group of n pixel data values is associated with a second object tag indicative of graphics-type image data; and, mapping the first group of n pixel data values to a LOW resolution setting when all of the first group of n pixel data values are associated with a third object tag indicative of pictorial-type image data.

* * * * *